May 27, 1930.                    O. SCHWIMMER                    1,759,872
                                 SAFETY GAS FITTING
                                 Filed Jan. 11, 1927

INVENTOR.
Oscar Schwimmer
BY Westall and Wallace
ATTORNEYS.

Patented May 27, 1930

1,759,872

UNITED STATES PATENT OFFICE

OSCAR SCHWIMMER, OF LOS ANGELES, CALIFORNIA

SAFETY GAS FITTING

Application filed January 11, 1927. Serial No. 160,322.

This invention relates to gas hose cocks and like fittings adapted to be connected to a hose or pipe, and pertains more particularly to a safety connection which automatically shuts off the flow of gas upon removal of the hose or pipe from the fitting.

It is common practice to provide gas hose cocks with tubular outlets or nozzles adapted to have flexible hoses attached thereto. The current practice is to secure a sleevelike rubber connector to the hose which connector is slipped over the nozzle and held in position by its grip upon the latter. Accidental disconnection which can occur in a variety of ways will cause the discharge of gas through an open cock into the air. In the case of gas heaters for residences, many deaths by asphyxiation as a result of accidental displacement and disconnection of hoses have resulted. This invention has for its primary object the provision of a hose cock which will automatically close upon removal of the connector. In addition to the broader objects of this invention there are certain details of design whereby a simple, economical, durable structure, easily installed, and not subject to tampering with is obtained.

Figure 1:
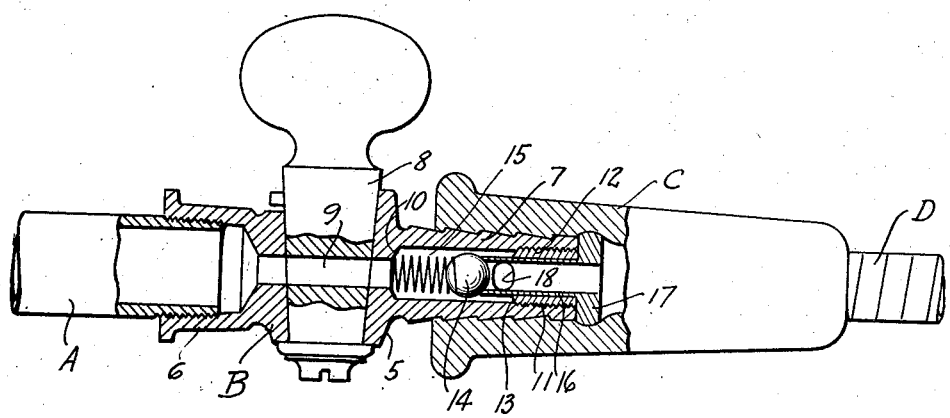
Figure 2:
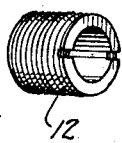
Figure 3:
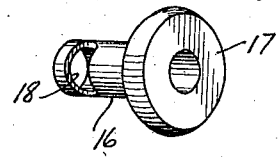

These objects together with other objects and corresponding accomplishments are obtained by means of the embodiment of my invention illustrated in the accompanying drawing, in which:

Fig. 1 is a vertical section through a service cock with parts shown in elevation, a fragment of of the service hose with its rubber connector being shown; Fig. 2 is a perspective view showing the seat bushing; and Fig. 3 is a perspective view of the actuating member for maintaining the ball off its seat.

Referring with more particularity to the drawing, A indicates a pipe forming a part of the house service system. It is externally threaded at the end and mounted thereon is the hose cock B. Mounted over the nozzle of the hose cock is a rubber connector C which is secured to a flexible hose D leading to the device to be supplied with gas.

The hose cock comprises a body 5 having a passage extending therethrough from the tubular inlet 6 to the nozzle 7. The inlet 6 is internally threaded so as to be attached to the pipe A. The nozzle is preferably provided with corrugations so that the connector C will obtain a good grip thereon. A tapered opening extends across the bore and is arranged to receive a tapered rotary core 8 having a bore 9 which may be registered with the passage from the inlet to the nozzle. The structure just described is that common for devices of this character.

The nozzle 7 has a bore provided with a shoulder 10, and at the outer end is internally threaded as indicated by 11. Secured in the bore of the nozzle is the seat bushing 12 having kerfs on the outer end to provide a hold for placing the seat in position or removing the same. The inner end which forms a seat is beveled as indicated by 13 to insure a tight joint when the ball 14 rests thereon. The ball 14 is disposed within the bore of the nozzle and is of such diameter that gas may pass around it, but if it is seated upon the bushing 12, it will stop the flow of gas. Back of the ball 14 is a compression spring 15 tending to force the ball upon its seat. If the ball is not held from its seat, the passage of gas through the cock would be prevented. I have therefore provided an actuating member. This comprises a tubular stem 16 having a disk head 17 of such diameter that it will be gripped by the connector C. Lateral ports 18 are provided in the stem. When the stem is positioned in the nozzle, with the head 17 resting against the end of the nozzle, the ball 14 will be maintained off its seat and gas may pass around the ball and through the cock in the usual manner. It will be noted that the stem 16 is beveled on its inner end to fit the ball. Thus when the ball is held off its seat, the portion in contact with this stem will be protected from any deposit of tar or gummy substance in the gas. As there is no tendency for the ball to turn, this clean surface will always contact with the seat, upon the actuating member being removed, and insure a tight closure. The fit between the stem 16 and the bore of the bushing 12 is free so that if the connector is displaced, the actuating member will likewise be displaced and the ball 14 will seat so as to close the cock.

The actuating member is separable from the cock, and in placing the connector in position, is disposed with its stem within the bore of the nozzle. The connector is then forced over the nozzle. This causes the head to be moved so that it seats against the end of the nozzle. The connector firmly grips the head so that the actuating member becomes in effect a portion of the connector. If the connector is removed, the actuating member is likewise removed from the nozzle and the ball 14 seats closing the cock. Upon restoring the connector to its position, the ball 14 is unseated by the stem of the actuating member and maintained in unseated position.

What I claim is:

A gas fitting comprising a discharge nozzle to receive a service tube, a bushing with an inner end seat detachably mounted in the bore of said nozzle, a valve for said seat whereby said valve tends to occlude the flow of gas through said fitting, an actuating member freely separable from said nozzle having a stem insertable in the bore thereof so as to unseat said valve and permit the flow of gas therethrough in combination with a connector for said service tube arranged to frictionally grip and yieldably hold said actuating member in its bore.

OSCAR SCHWIMMER.